(12) United States Patent
Ueda

(10) Patent No.: US 11,201,511 B2
(45) Date of Patent: Dec. 14, 2021

(54) STATOR FOR ELECTRIC MOTOR AND ELECTRIC MOTOR

(71) Applicant: Nidec Corporation, Kyoto (JP)

(72) Inventor: Tomoya Ueda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 138 days.

(21) Appl. No.: 16/497,892

(22) PCT Filed: Mar. 8, 2018

(86) PCT No.: PCT/JP2018/009035
§ 371 (c)(1),
(2) Date: Sep. 26, 2019

(87) PCT Pub. No.: WO2018/180344
PCT Pub. Date: Oct. 4, 2018

(65) Prior Publication Data
US 2020/0036237 A1 Jan. 30, 2020

(30) Foreign Application Priority Data
Mar. 31, 2017 (JP) .............................. JP2017-070712

(51) Int. Cl.
*H02K 1/14* (2006.01)
*H02K 1/18* (2006.01)
*H02K 1/27* (2006.01)
*H02K 3/52* (2006.01)

(52) U.S. Cl.
CPC .................. *H02K 1/14* (2013.01); *H02K 1/18* (2013.01); *H02K 1/2706* (2013.01); *H02K 3/521* (2013.01)

(58) Field of Classification Search
CPC .......... H02K 1/14; H02K 1/18; H02K 1/2706; H02K 3/521; H02K 1/148; H02K 1/00–1/34
See application file for complete search history.

(56) References Cited

U.S. PATENT DOCUMENTS

| 5,289,066 A | * | 2/1994 | Clark | ....................... H02K 1/12 310/156.26 |
| 2017/0085138 A1 | * | 3/2017 | Nakano | .................... H02K 1/14 |
| 2018/0115202 A1 | * | 4/2018 | Hirotani | ............... H02K 1/2706 |

FOREIGN PATENT DOCUMENTS

| JP | 03-169235 A | 7/1991 |
| JP | 05-344665 A | 12/1993 |
| JP | 2004-180383 A | 6/2004 |
| JP | 2004180383 A * | 6/2004 |

(Continued)

OTHER PUBLICATIONS

Machine Translation, Yamada, JP-2004180383-A, Jun. 2004. (Year: 2004).*

(Continued)

*Primary Examiner* — Thomas Truong
(74) *Attorney, Agent, or Firm* — Keating & Bennett

(57) ABSTRACT

A stator of an electric motor includes a multilayer body including annular core sheets stacked in layers. A first annular core sheet includes linking portions, each of which defines a link between tips of two adjacent teeth and includes a seam. A first linking portion provides a link between teeth associated with a U phase. A second linking portion provides a link between teeth associated with a V phase. A third linking portion provides a link between teeth associated with a W phase.

13 Claims, 20 Drawing Sheets

(56) References Cited

FOREIGN PATENT DOCUMENTS

| JP | 2005-080474 A | | 3/2005 |
|----|---------------|---|--------|
| JP | 2005080474 A | * | 3/2005 |
| JP | 2011-035947 A | | 2/2011 |
| JP | 2016-144235 A | | 8/2016 |

OTHER PUBLICATIONS

Machine Translation, Goto, JP-2005080474-A, Mar. 2005. (Year: 2005).*
Official Communication issued in International Patent Application No. PCT/JP2018/009035, dated May 22, 2018.

* cited by examiner

STATOR FOR ELECTRIC MOTOR AND ELECTRIC MOTOR

CROSS REFERENCE TO RELATED APPLICATIONS

This is a U.S. national stage of PCT Application No. PCT/JP2018/009035, filed on Mar. 8, 2018, and priority under 35 U.S.C. § 119(a) and 35 U.S.C. § 365(b) is claimed from Japanese Application No. 2017-070712, filed Mar. 31, 2017; the entire disclosures of each application are hereby incorporated herein by reference.

1. FIELD OF THE INVENTION

The present disclosure relates to a stator for an electric motor and an electric motor.

2. BACKGROUND

There has been an increasing demand for electric motors (hereinafter simply referred to as "motors") with reduced vibrations. In particular, to achieve improved steering feel, motors for electric power steering apparatuses will benefit from improved vibration reduction. As an approach to addressing these demands, a technique is known which increases the stiffness of stators to reduce vibrations of motors.

For example, Japanese Unexamined Patent Application Publication No. 3-169235 discloses an annular stator that includes a toothed iron core including a plurality of iron core members stacked in layers and a yoke iron core having an annular shape to engage with an outer circumferential portion of the toothed iron core. Each iron core member includes a plurality of tooth portions and a bridging portion forming a connection between tips of two adjacent tooth portions included in the plurality of tooth portions. According to a method for producing stators, a plurality of iron core members are stamped out of a steel sheet. The iron core members are individually rotated a certain angle and stacked on top of one another to form a toothed iron core. Windings are wound around the toothed iron core from the outer circumferential side thereof, and the toothed iron core is then press-fitted to the inner circumferential portion of the yoke iron core to form a stator. This stator structure conceivably enables a reduction in flux leakage, with increased mechanical strength imparted to the stator by the bridging portions.

These motors are in need of further improvements in vibration reduction.

SUMMARY

Example embodiments of the present disclosure provide stators capable of reducing vibration of a motor.

A stator of a motor according to an example embodiment of the present disclosure includes a multilayer body including a plurality of annular core sheets stacked in layers and a plurality of multilayer teeth, and a plurality of windings fastened around the plurality of multilayer teeth. Each of the plurality of annular core sheets includes an annular core back and a plurality of teeth disposed at regular intervals along an inner circumference of the core back and protruding toward a center of the core back. The plurality of windings include windings of three phases. The three phases include a first phase, a second phase, and a third phase. The plurality of teeth included in each of the plurality of annular core sheets are respectively associated with the first phase, the second phase, and the third phase. The plurality of annular core sheets include a first annular core sheet. The first annular core sheet includes a plurality of linking portions, each of the plurality of linking portions defining a link between tips of two adjacent teeth and including a seam. The plurality of linking portions include a first inking portion, a second linking portion, and a third linking portion. The first linking portion provides a link between the teeth associated with the first phase, the second linking portion provides a link between the teeth associated with the second phase, and the third linking portion provides a link between the teeth associated with the third phase.

The above and other elements, features, steps, characteristics and advantages of the present disclosure will become more apparent from the following detailed description of the example embodiments with reference to the attached drawings.

DETAILED DESCRIPTION

Hereinafter, example embodiments of stators for a motor and motors of the present disclosure will be described in detail with reference to the accompanying drawings. It should be noted that description more detailed than necessary is omitted in places. For example, detailed description of well-known features or repeated description of configurations substantially identical to each other is omitted in places. Such an omission aims to eliminate unnecessary redundancy and to provide a person skilled in the art with an easy-to-understand description.

Example Embodiment

Figure 1:
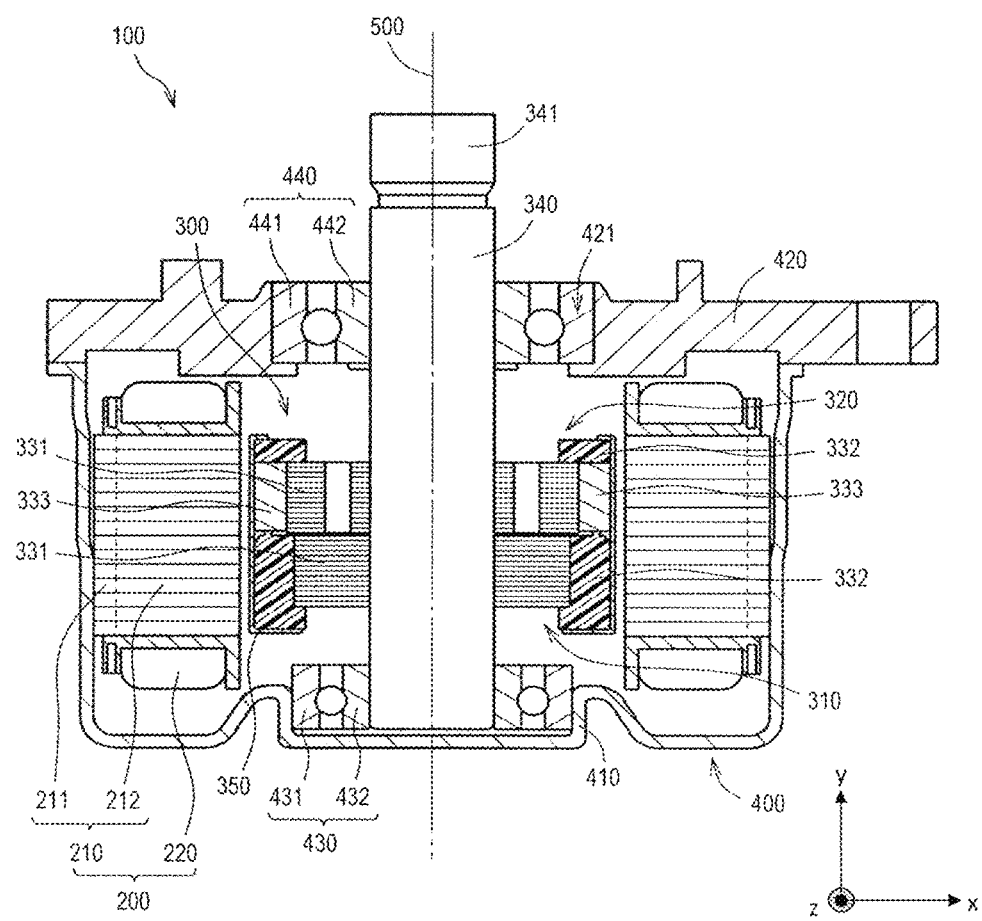
FIG. 1 is a sectional view of a motor 100 according to an example embodiment of the present disclosure taken along a central axis 500, illustrating an exemplary configuration thereof.

FIG. 1 is a sectional view of a motor 100 taken along a central axis 500, illustrating an exemplary configuration thereof.

The motor 100 according to the present example embodiment is an "inner-rotor motor". The motor 100 may be installed in a motor vehicle and suitably used as a motor for an electric power steering apparatus. In such a case, the motor 100 generates a driving force for the electric power steering apparatus.

The motor 100 includes a stator 200, a rotor 300, a housing 400, a lid portion 420, a lower bearing 430, and an upper bearing 440. The stator 200 is also referred to as an armature.

The housing 400 is a casing having a substantially cylindrical shape with a bottom and accommodating the stator 200, the lower bearing 430, and the rotor 300. The bottom of the housing 400 has, in the center thereof, a recessed portion 410, in which the lower bearing 430 is held. The lid portion 420 is a plate-like member covering an opening in the upper portion of the housing 400. The lid portion 420 has, in the center thereof, a circular hole 421, in which the upper bearing 440 is held.

The stator 200 has an annular shape and includes a multilayer body (also referred to as a "multilayer annular core") 210 and windings (also referred to as "coils") 220. The stator 200 creates a magnetic flux in accordance with the drive current. The multilayer body 210 is constructed of multilayer steel sheets stacked in the direction of the central axis 500 (the y direction in FIG. 1) and includes a multilayer core back 211 having an annular shape and a plurality of multilayer teeth 212. The multilayer core back 211 is fixed to an inner wall of the housing 400. A detailed description of the structure of the stator 200 will be given later. The central axis 500 is the rotation axis of the rotor 300.

The individual windings 220 are constructed of conductors (generally constructed of copper wires) and are typically fastened around respective multilayer teeth 212 of the multilayer body 210.

The lower bearing 430 and the upper bearing 440 constitute a mechanism by which a shaft 340 of the rotor 300 is rotatably supported. For example, each of the lower bearing 430 and the upper bearing 440 may be a ball bearing having an outer race and an inner race that rotate with respect to each other via balls therebetween. The ball bearings are illustrated in FIG. 1.

An outer race 431 of the lower bearing 430 is fixed to the recessed portion 410 of the housing 400. An outer race 441 of the upper bearing 440 is fixed to an edge of the circular hole 421 of the lid portion 420. An inner race 432 of the lower bearing 430 and an inner race 442 of the upper bearing 440 are fixed to the shaft 340. Thus, the shaft 340 is supported in a manner so as to be rotatable with respect to the housing 400 and the lid portion 420.

The rotor 300 includes rotor units 310 and 320, the shaft 340, and a cover 350. The shaft 340 is a member having a substantially cylindrical shape and extending along the central axis 500 in the vertical direction. The shaft 340 is rotatably supported by the lower bearing 430 and the upper bearing 440 and is rotatable about the central axis 500. The shaft 340 has a head portion 341 at the tip close to the lid portion 420. The head portion 341 is coupled to, for example, a power transmission mechanism such as a gear that transmits a driving force to an electric power steering apparatus of an electric vehicle.

The rotor units 310 and 320 and the cover 350 rotate in conjunction with the shaft 340 within an inner space extending in a radial direction of the stator 200. Each of the rotor units 310 and 320 includes a rotor core 331, a magnet holder 332, and a plurality of magnets 333. The rotor units 310 and 320 are disposed along the central axis 500 in a manner so as to be oriented upside down with respect to each other. The plurality of magnets 333 are disposed at substantially regular intervals along the circumference of the rotor 300.

The cover 350 is a member having a substantially cylindrical shape and supporting the rotor units 310 and 320. The cover 350 covers the outer circumferential surfaces of the rotor units 310 and 320 and part of upper and lower end faces thereof. The rotor units 310 and 320 are held so as to be close to each other or in contact with each other accordingly.

When the motor 100 causes a current to flow through the windings 220 of the stator 200, a magnetic flux extending in a radial direction is created in the multilayer teeth 212 of the multilayer body 210. Torque is produced in the circumferential direction by the action of the magnetic flux between the multilayer teeth 212 and the magnets 333, thus causing the rotor 300 to rotate about the central axis 500 with respect to the stator 200. Rotations of the rotor 300 generate, for example, a driving force for the electric power steering apparatus.

Referring to FIGS. 2 to 6, the following describes in detail the structure of the stator 200 according to the present example embodiment.

The stator 200 according to an example embodiment of the present disclosure may include M teeth, namely, M slots (M being an integer greater than or equal to 2). To give a specific example, the following describes the structure of the stator 200 including 12 teeth (12 slots).

Figure 2:
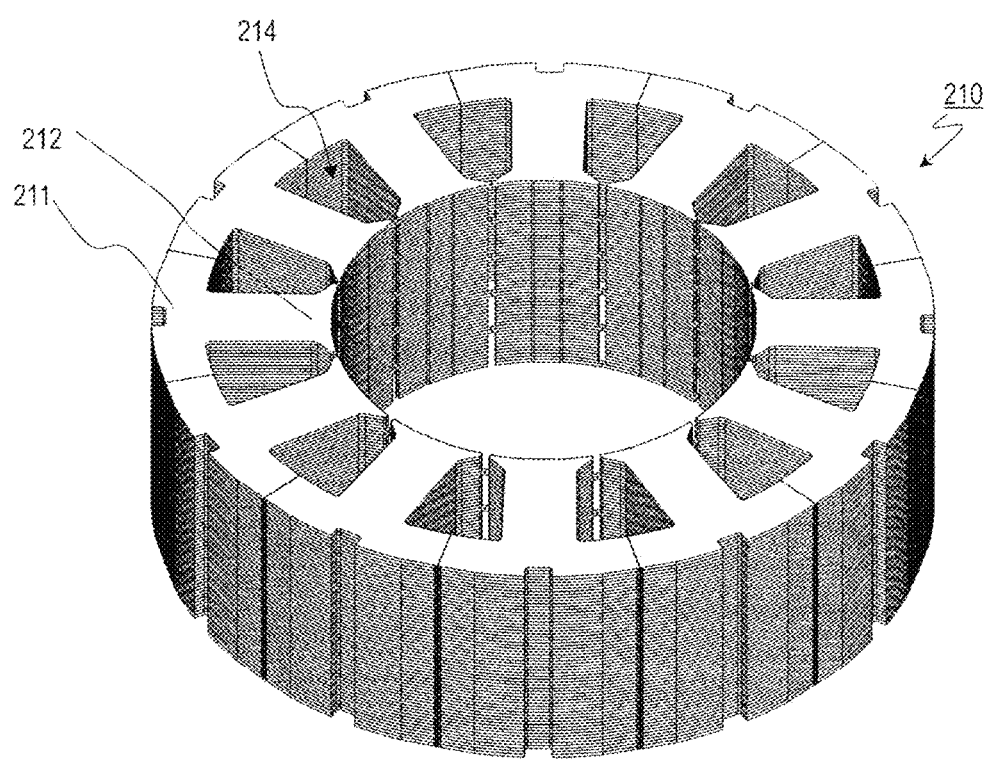
FIG. 2 is a perspective view of a multilayer body 210 according to an example embodiment of the present disclosure.
Figure 3:
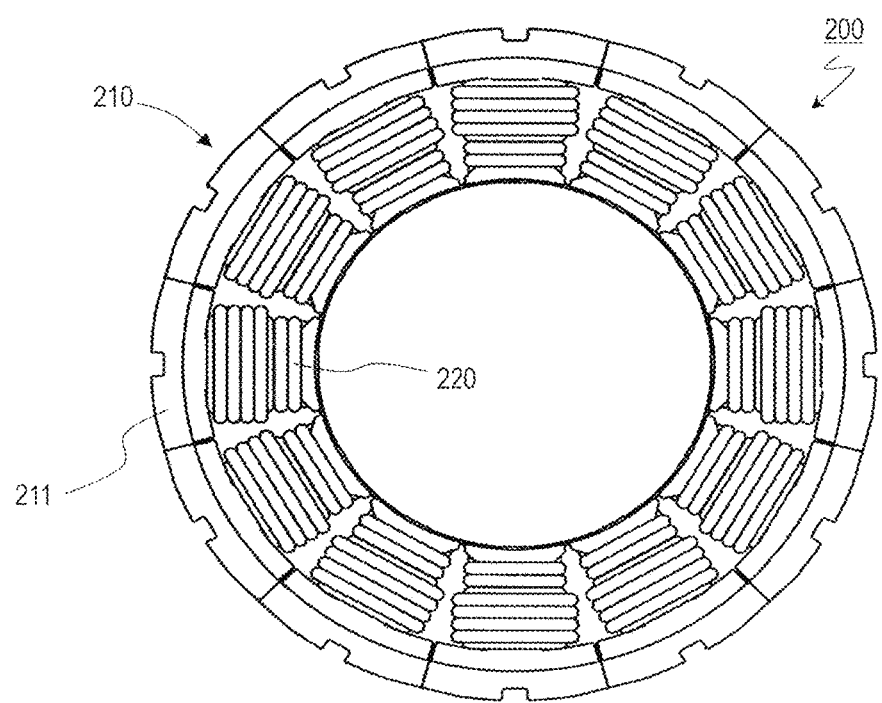
FIG. 3 is a plan view of a stator 200 according to an example embodiment of the present disclosure seen in the stacking direction of the multilayer body 210, with windings 220 fastened to the multilayer body 210.
Figure 4:
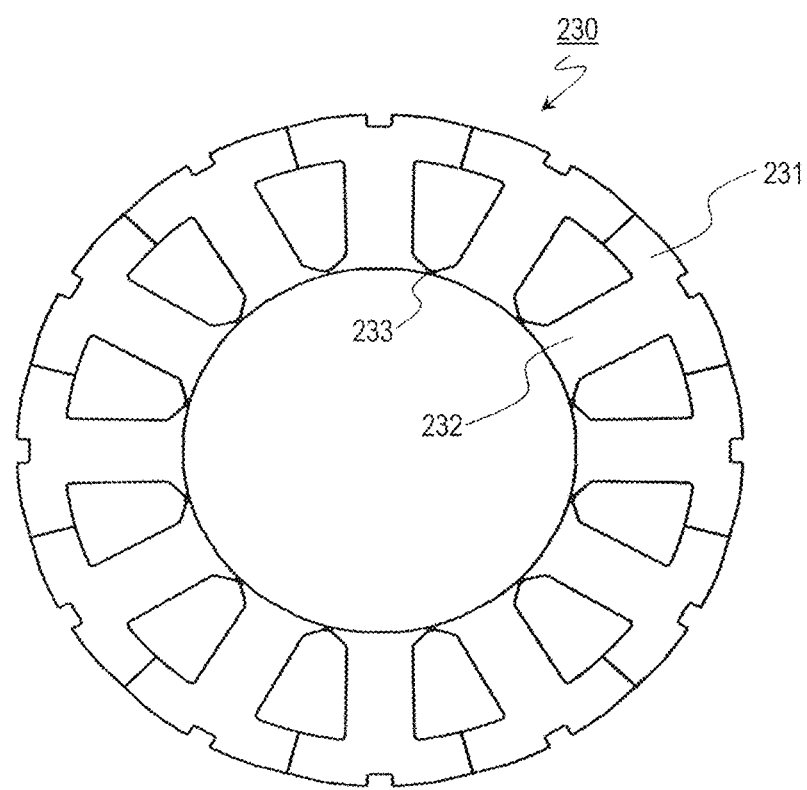
FIG. 4 is a plan view of annular core sheets 230 defining the multilayer body 210, seen in the stacking direction of the multilayer body 210.

FIG. 2 is a perspective view of the multilayer body 210. FIG. 3 is a plan view of the stator 200 seen in the stacking direction of the multilayer body 210, with the windings 220 fastened to the multilayer body 210. FIG. 4 is a plan view of annular core sheets 230 constituting the multilayer body 210, seen in the stacking direction of the multilayer body 210.

The stator 200 includes the multilayer body 210 and the windings 220. The multilayer body 210 includes 12 multilayer teeth 212 and the multilayer core back 211. The 12 multilayer teeth 212 protrude toward the center of the annular multilayer core back 211. Slots 214 are each defined between two corresponding adjacent multilayer teeth 212.

The individual multilayer teeth 212 are provided with the windings 220. Alternatively, at least one of the 12 multilayer teeth 212 may be provided with the winding 220. Of the 12 multilayer teeth 212, nine or six multilayer teeth 212, for example, may be provided with the windings.

The multilayer body 210 includes the plurality of annular core sheets 230 stacked in layers. The multilayer body 210 according to the present example embodiment includes 60 annular core sheets 230. However, the number of stacked sheets is not limited to this value and is determined as appropriate, for example, in accordance with requisite characteristics demanded of the motor. For example, the number of stacked sheets may be equal to or greater than the number of slots. It is certainly possible for the number of stacked sheets to be smaller than the number of slots.

Each of the annular core sheets 230 includes an annular core back 231 and 12 teeth 232 disposed at regular intervals along the inner circumference of the core back 231 and protruding toward the center of the core back 231. The expression "at regular intervals" herein does not necessarily mean that the objects of interest are disposed at regular intervals in a strict sense but may also mean that the objects of interest are disposed at substantially regular intervals. The tips of the 12 teeth 232 are disposed to form an annular shape, thus constituting the inner circumference of the annular core sheet 230. In the multilayer body 210, the plurality of annular core sheets 230 are stacked on top of one another in such a manner that the positions of the 12 teeth 232 of one annular core sheet 230 coincide with the positions of the 12 teeth 232 of another annular core sheet 230. As illustrated in FIG. 4, the annular core sheet 230 includes a linking portion 233 forming a link between tips of two adjacent teeth of a pair of teeth 232 and including a seam. However, the present disclosure is not limited to this configuration, and each of the annular core sheets 230 may include a plurality of linking portions 233. Alternatively, in the multilayer body 210, one annular core sheet 230 including 12 linking portions 233, which are equal in number to the teeth 232, and two successive annular core sheets 230 including no linking portion 233 may be stacked in an alternating manner. In the present disclosure, at least one of the plurality of annular core sheets 230 may include at least one linking portion 233. In other words, the multilayer body 210 is to include at least one linking portion 233.

Figure 5A:
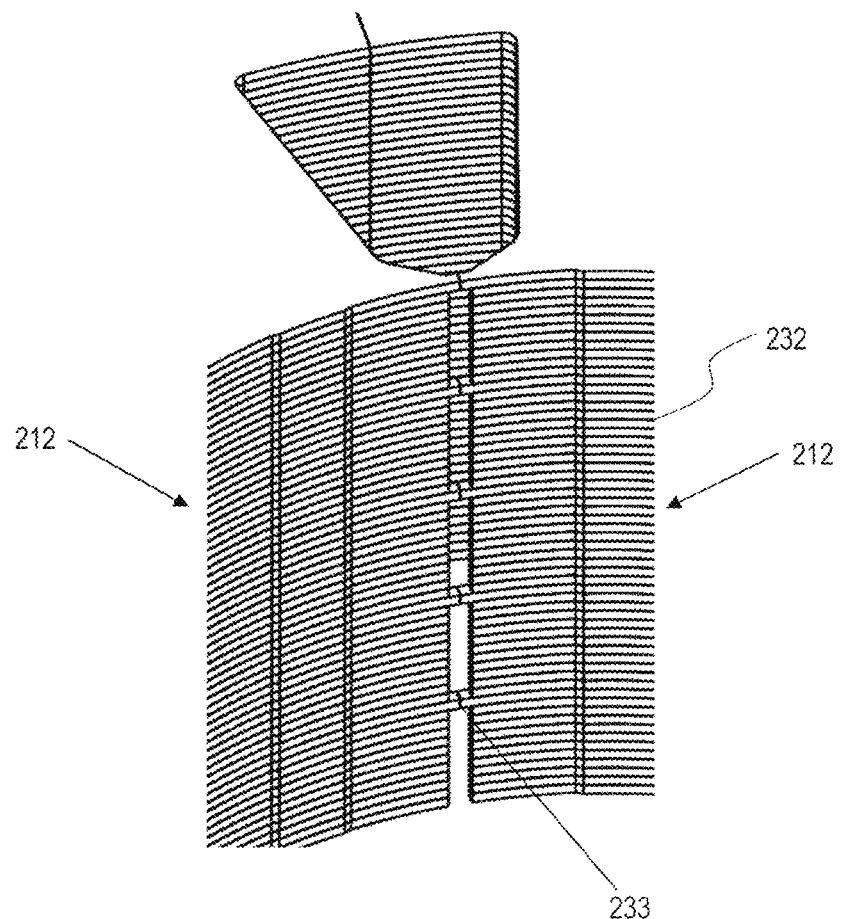
FIG. 5A is a schematic enlarged view of two adjacent multilayer teeth of a pair of multilayer teeth 212.
Figure 5B:
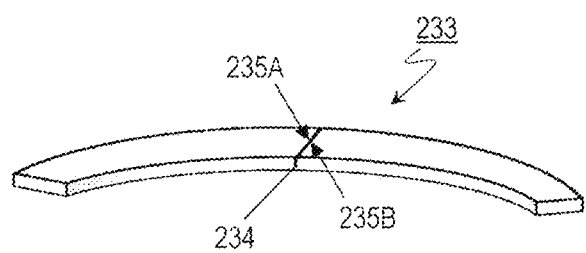
FIG. 5B is a schematic enlarged view of one of a plurality of linking portions 233 that is located between two adjacent multilayer teeth of a pair of multilayer teeth 212.
Figure 6:
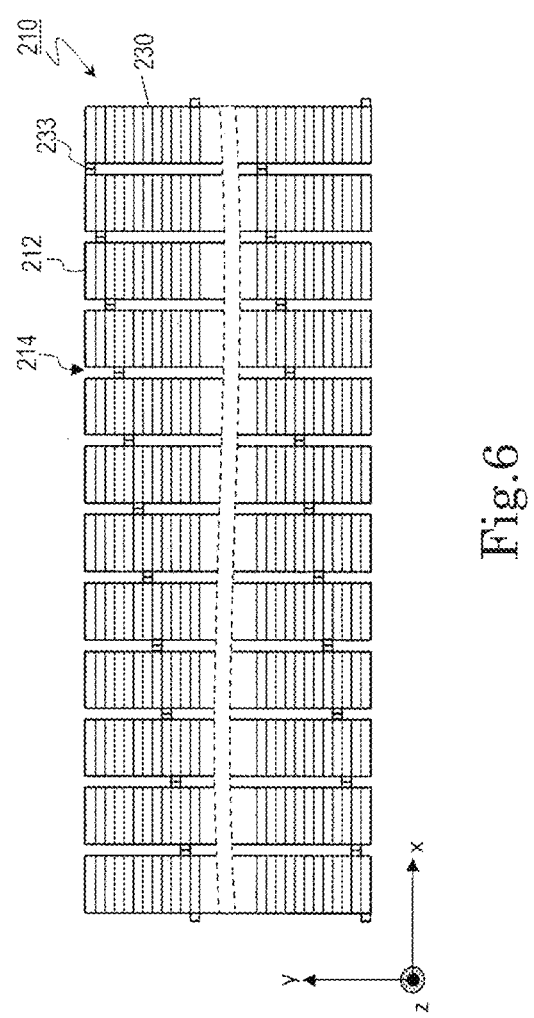
FIG. 6 is a development view of the multilayer body 210 obtained by cutting, in the y direction, a multilayer core back 211 between two multilayer teeth of a pair of multilayer teeth 212 and by unfolding the multilayer body 210 in the x direction.

FIG. 5A is an enlarged view of two adjacent multilayer teeth of a pair of multilayer teeth 212. FIG. 5B is an enlarged view of one of the plurality of linking portions 233 that is located between two adjacent multilayer teeth of a pair of multilayer teeth 212. FIG. 6 is a development view of the multilayer body 210 obtained by cutting, in the y direction, the multilayer core back 211 between two multilayer teeth of a pair of multilayer teeth 212 and by unfolding the multilayer body 210 in the x direction.

A plurality of linking portions 233 are located between tips of two adjacent multilayer teeth of a pair of multilayer teeth 212. In the present example embodiment, one in every 12 annular core sheets 230 among the 60 annular core sheets 230 is provided with one linking portion 233. Five linking portions 233 are located between tips of two adjacent multilayer teeth of a pair of multilayer teeth 212. This arrangement is merely an example, and the linking portions 233 may be arranged in various patterns. For example, five linking portions 233 may be located between tips of two adjacent multilayer teeth of a pair of multilayer teeth 212, whereas four linking portions 233 may be located between tips of two adjacent multilayer teeth of another pair of multilayer teeth 212. Alternatively, five or more linking portions 233 may be located between tips of two adjacent multilayer teeth of a pair of multilayer teeth 212, whereas no linking portion 233 may be located between tips of two adjacent multilayer teeth of another pair of multilayer teeth 212. According to the present disclosure, the multilayer body 210 is to include at least one linking portion 233. For example, one annular core sheet 230 may include as many linking portions 233 as the number of the teeth 232, whereas another annular core sheet may include no linking portion 233.

Figure 9:
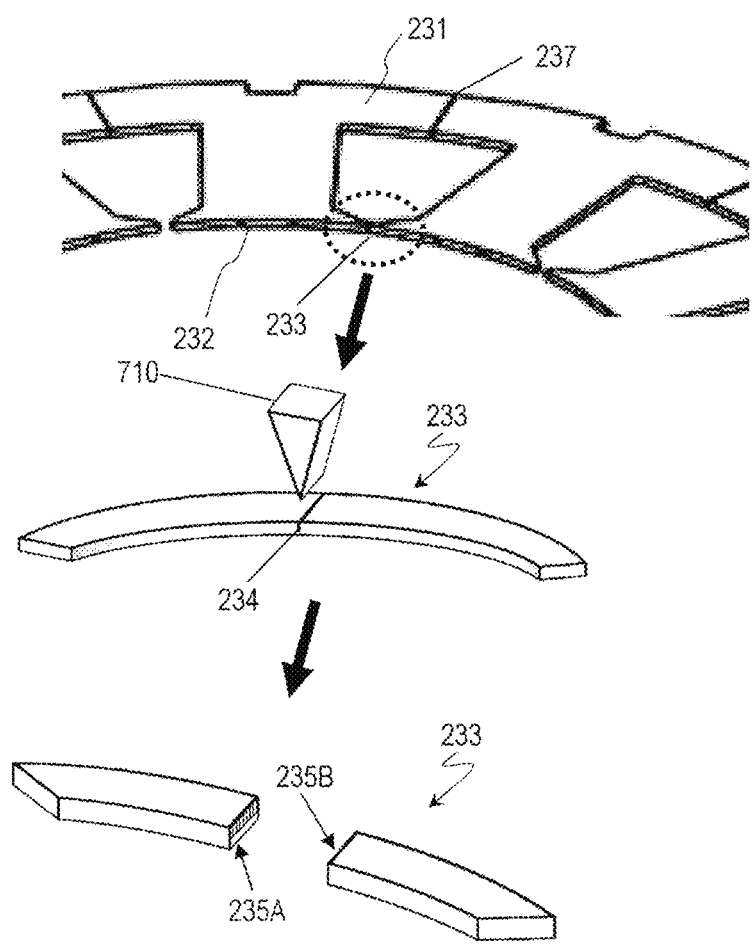
FIG. 9 is a schematic diagram illustrating the process of cutting a linking portion 233 with a cutter blade 710.

As illustrated in FIG. 5B, each linking portion 233 includes a seam 234. The seam 234 is seemingly indiscernible. In actuality, the seam 234 has two sections 235A and 235B formed by mechanical cutting as illustrated in FIG. 9, which will be described later in detail. Specifically, the first section 235A on one side of the linking portion 233 closer to one of two adjacent teeth 212 and the second section 235B on the other side of the linking portion 233 are in contact with each other at the seam 234. The two sections 235A and 235B may have an adhesive agent therebetween or the two sections 235A and 235B may be coated with a non-magnetic material.

According to the structure of the stator disclosed in Japanese Unexamined Patent Application Publication No. 3-169235, a connection between two adjacent tooth portions of a pair of tooth portions is still formed, as described above, by a continuous bridging portion formed without mechanical cutting, and thus flux leakage occurs through the bridging portion. Meanwhile, the linking portion 233 according to the present disclosure is not continuous due to mechanical cutting, whereas sections of the linking portion 233 are in contact with each other. While the motor is rotating, a magnetic force is generated in the radial direction of the stator 200 to impart stress on the stator 200 in a manner so as to reduce the distance between two adjacent teeth 232, where the above feature enables the linking portions 233 to suppress the stress. The linking portions 233 thus increase the stiffness of the stator (specifically, the strength of the inner circumferential portion of the multilayer body 210). Furthermore, the sections formed by mechanical cutting suppress the occurrence of flux leakage through the linking portions 233. Suppressing the occurrence of flux leakage leads to, for example, an improvement in cogging torque.

The multilayer body 210 may include a plurality of linking portions 233 disposed in the circumferential direction of the core backs 231 (i.e., rings formed by the tips of the teeth 232) cyclically across the layers of the plurality of annular core sheets 230. As illustrated in FIG. 6, when 12 successive annular core sheets 230 are taken from the 60 annular core sheets 230 of the multilayer body 210, 12 linking portions 233 may be arranged in such a manner that linking portions of two annular core sheets 230 lying next to each other are located in two respective adjacent slots 214. In other words, the 12 linking portions 233 may be arranged in a spiral fashion in the circumferential direction across the layers of the plurality of annular core sheets 230. With a small number of linking portions 233 provided, adopting this spiral structure ensures adequate strength of the inner circumferential portion of the multilayer body 210.

Referring to FIGS. 7 to 14, the following describes a specific example method for producing the motor 100 and the stator 200.

Figure 7:
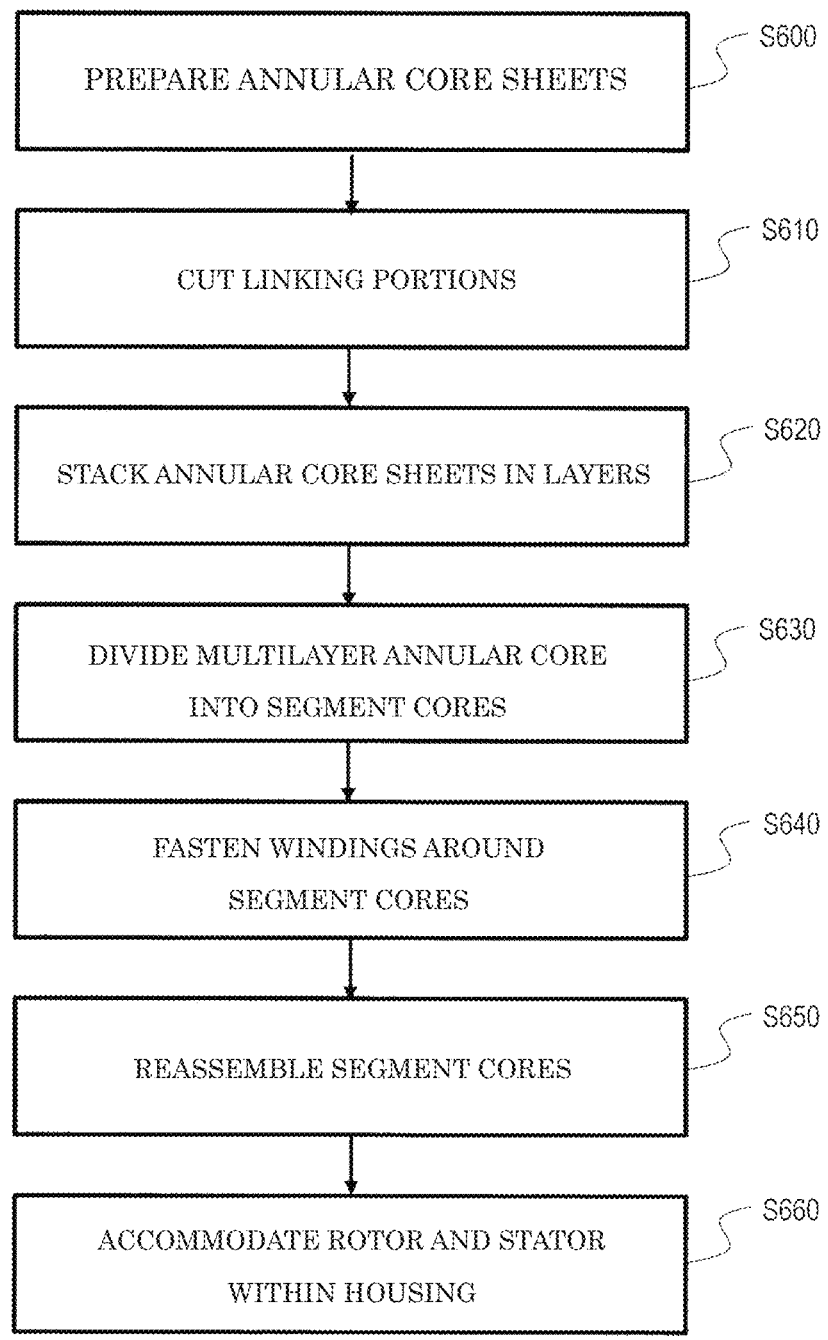
FIG. 7 is a flowchart of processes carried out according to the method for producing the motor 100 and the stator 200.

FIG. 7 describes an exemplary flow of the method for producing the motor 100 and the stator 200. The method for producing the stator 200 according to the present example embodiment includes: the step of preparing a plurality of annular core sheets 230 (S600); the step of cutting linking portions 233 (S610); the step of forming a multilayer annular core (multilayer body) 210 (S620); the step of dividing the multilayer annular core 210 into a plurality of segment cores 250 (S630); the step of fastening windings 220 around the segment cores 250 (S640); and the step of reassembling the plurality of segment cores 250 into a stator 200 (S650). The method for producing the motor 100 includes, in addition to these steps, the step of accommodating the stator 200 and a rotor 300 within a housing 400 (S660).

First, in Step S600, a plurality of annular core sheets 230 illustrated in FIG. 4 are prepared. For example, 12 or more annular core sheets 230, which are equal in number to the teeth 232, are prepared. However, the number of annular core sheets to be prepared is not limited to this value as mentioned above and is determined as appropriate, for example, in accordance with requisite characteristics demanded of the motor 100. For example, 60 annular core sheets 230 are prepared to form the multilayer body 210 illustrated in FIG. 2. Each annular core sheet 230 includes a core back 231, 12 teeth 232, and a linking portion 233 forming a link between tips of two adjacent teeth of a pair of teeth 232. In Step 600, a seam 234 remains to be formed in the linking portion 233. The necessary number of annular core sheets 230 may be prepared, where at least one of the plurality of annular core sheets 230 is to include at least one linking portion 233.

Figure 8A:
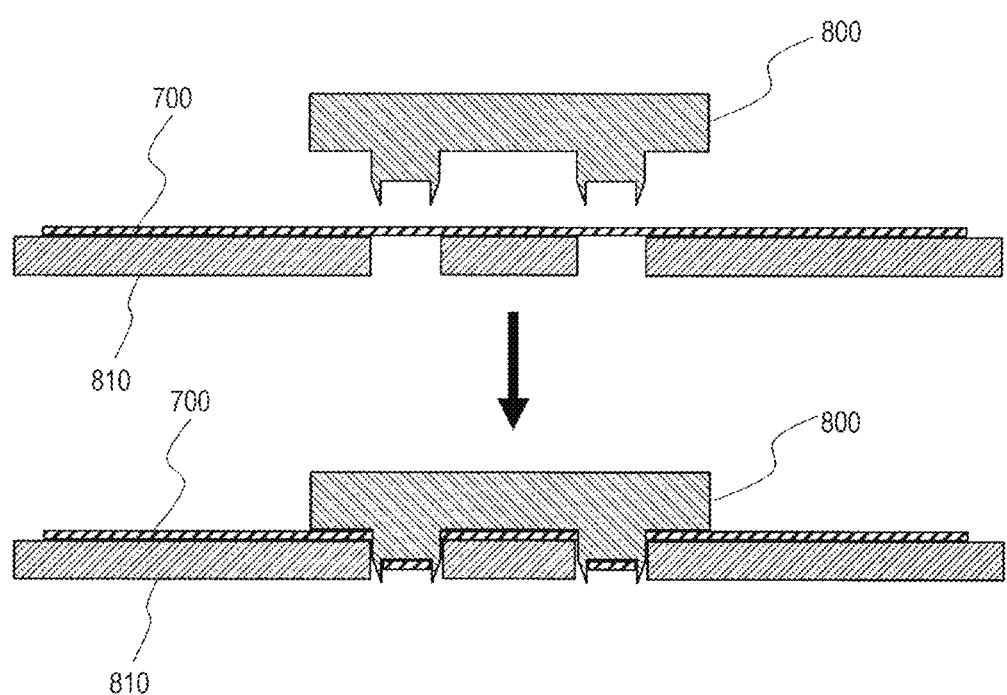
FIG. 8A is a schematic diagram illustrating the process of stamping, with a stamping tool 800, a magnetic steel sheet 700 into an annular shape to form a plurality of annular core sheets 230.
Figure 8B:
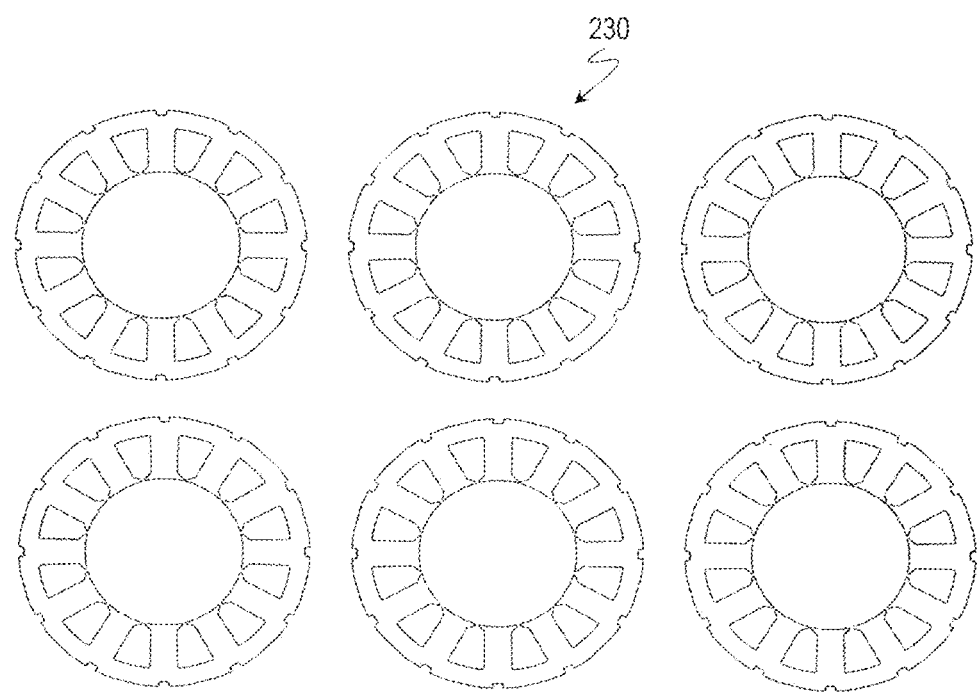
FIG. 8B is a schematic diagram illustrating the plurality of annular core sheets 230 formed by stamping.

FIG. 8A schematically illustrates the process of stamping, with a stamping tool 800, a magnetic steel sheet 700 into the annular shape to form a plurality of annular core sheets 230. FIG. 8B schematically illustrates the plurality of annular core sheets 230 formed by stamping. The procedure for preparing a plurality of annular core sheets 230 may involve, as illustrated, placing the magnetic steel sheet 700 on a die 810 and stamping, with the stamping tool (punch) 800, the magnetic steel sheet 700 into the annular shape to form a plurality of annular core sheets 230. Instead of press working, wire electric discharge machining or laser machining may be used. Alternatively, a plurality of annular core sheets 230 may be provided, for example, as machine parts by a supplier. In the present example embodiment, the magnetic steel sheet 700 is stamped into the annular shape with the stamping tool 800 to form 60 annular core sheets 230.

Subsequently, in Step S610, linking portions 233 are cut.

FIG. 9 schematically illustrates the process of cutting a linking portion 233 with a cutter blade 710. For example, a substantially middle part of the linking portion 233 is mechanically cut with the cutter blade 710 to form a seam 234. Accordingly, a first section 235A is formed on one side of the linking portion 233 closer to one of two adjacent teeth 232, and a second section 235B is formed on the other side of the linking portion 233. The annular core sheets 230 are individually subjected to mechanical cutting to have their linking portions 233 cut, and each of the linking portions 233 of the plurality of annular core sheets 230 includes a seam 234 formed therein accordingly. As illustrated in FIG. 9, score lines 237 are each preferably formed in a substantially middle part of the core back 231 between two corresponding adjacent teeth 232, in preparation for the process of dividing the multilayer annular core 210 in Step S630, which will be described later.

Then, in Step S620, the plurality of annular core sheets 230 are stacked into a multilayer annular core 210 including 12 multilayer teeth 212. In the present example embodiment, 60 annular core sheets 230 are stacked, and the plurality of annular core sheets 230 are then fastened to one another by, for example, caulking, bonding, or laser welding. The multilayer annular core 210 including 12 multilayer teeth 212 is formed accordingly. The multilayer annular core 210 is equivalent to the multilayer body 210 described above.

Figure 10:
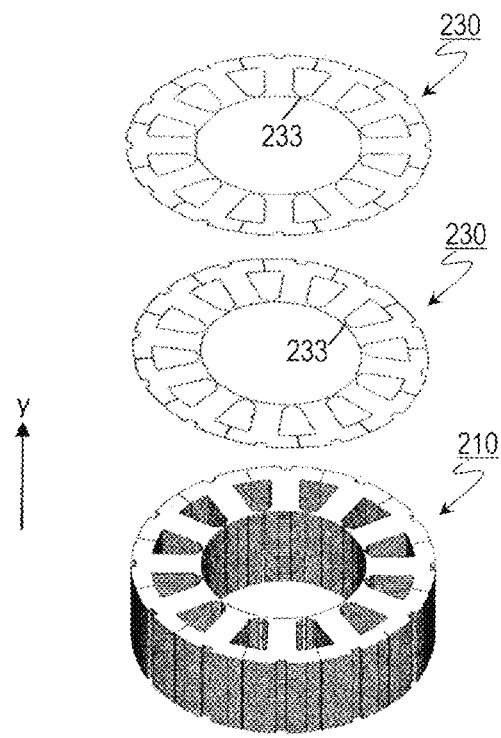
FIG. 10 is a schematic diagram illustrating the process of stacking, on top of one another, the plurality of annular core sheets 230 individually rotated a predetermined angle in the circumferential direction.

FIG. 10 schematically illustrates the process of stacking, on top of one another, the plurality of annular core sheets 230 individually rotated a predetermined angle in the circumferential direction. Of the 60 annular core sheets 230, two annular core sheets 230 are illustrated in FIG. 10. The plurality of annular core sheets 230 are preferably stacked on top of one another in a manner so as to be individually rotated a predetermined angle in the circumferential direction. This stacking process is generally described as "rotational stacking". The rotational stacking, by which the linking portions 233 are arranged in a spiral fashion, ensures adequate strength of the inner circumferential portion of the multilayer body 210.

The predetermined angle is given by multiplying 360/M by N (N being an integer greater than or equal to 1). As described above, M represents the number of teeth (or slots). When M=12, the predetermined angle is an integer multiple of 30°. In the present example embodiment, the 60 annular core sheets are stacked on top of one another in a manner so as to be individually rotated 30° clockwise as illustrated in FIG. 10. The arrangement pattern of the linking portions 233 illustrated in FIG. 6 (i.e., the spiral structure) is formed in the multilayer annular core 210 accordingly. The y direction in FIG. 10 is parallel to the central axis of the multilayer annular core 210. In the y direction, the 60 annular core sheets 230 are stacked on top of one another in such a manner their respective 12 teeth 232 are uniformly positioned.

Then, in Step S630, the multilayer annular core 210 is divided into 12 or less segment cores 250.

Figure 11A:
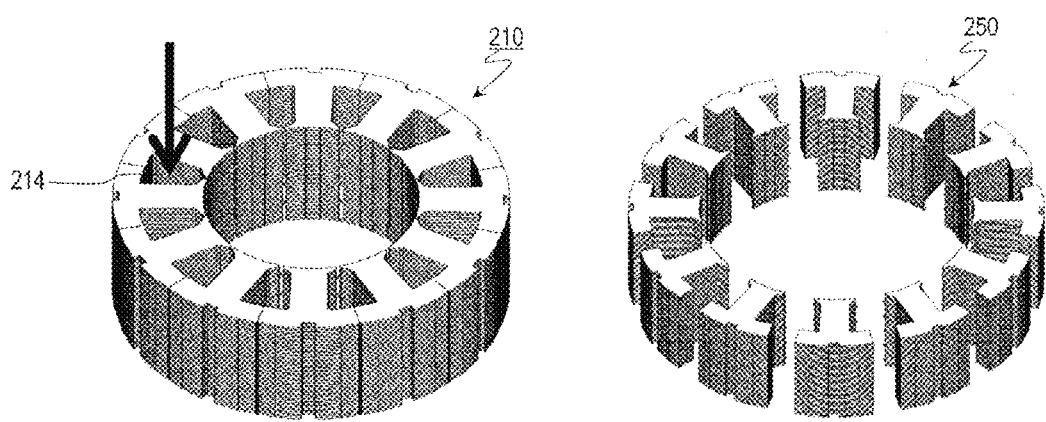
FIG. 11A is a schematic diagram illustrating the process of dividing a multilayer annular core 210 into 12 segment cores 250.
Figure 11B:
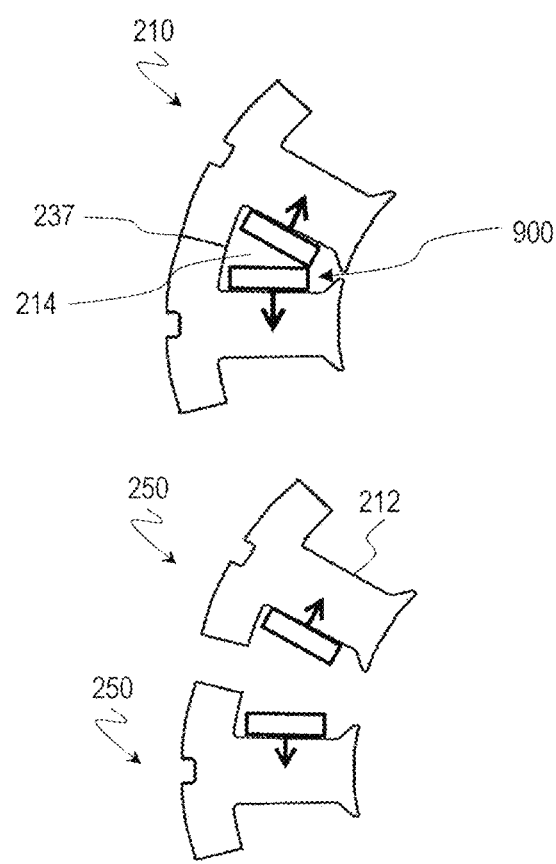
FIG. 11B is a schematic diagram illustrating the process of inserting a jig 900 into a slot 214 to divide the multilayer annular core 210.
Figure 11C:
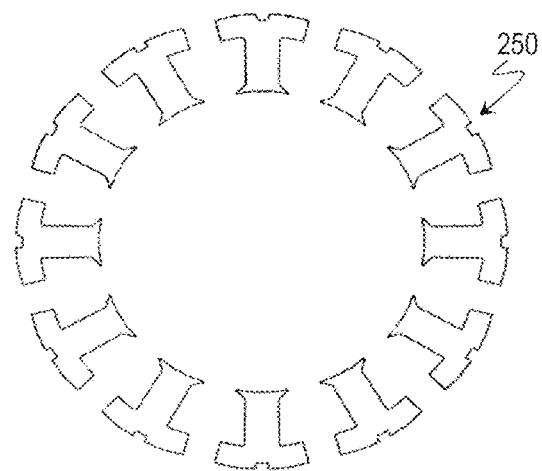
FIG. 11C is a plan view of the 12 segment cores 250 seen in the stacking direction of the multilayer body 210.

FIG. 11A schematically illustrates the process of dividing the multilayer annular core 210 into 12 segment cores 250. FIG. 11B schematically illustrates the process of inserting a jig 900 into a slot 214 to divide the multilayer annular core 210. FIG. 11C is a plan view of the 12 segment cores 250 seen in the stacking direction of the multilayer body 210. FIG. 11B is an enlarged illustration of part of the multilayer annular core 210. The jig 900 is inserted into the slot 214, for example, in the direction of the arrow of FIG. 11A. Specifically, as illustrated in FIG. 11B, the jig 900 is inserted into the slot 214 to apply force in the circumferential direction of the multilayer annular core 210, and thus the multilayer annular core 210 is divided into segment cores 250, each of which includes a corresponding multilayer tooth 212. Forming the score lines 237 in the core back 231 of each annular core sheet 230 in advance in Step S610 facilitates the process of dividing the multilayer annular core 210. The step of dividing may be carried out by inserting the jig 900 into the individual slots 214 on a one-by-one basis or all at once.

When concentrated winding is employed, the multilayer annular core 210, as a rule, is divided in such a manner that each segment core 250 has a corresponding multilayer tooth 212.

Then, in Step S640, the winding 220 is fastened around at least one of the 12 segment cores 250.

Figure 12A:
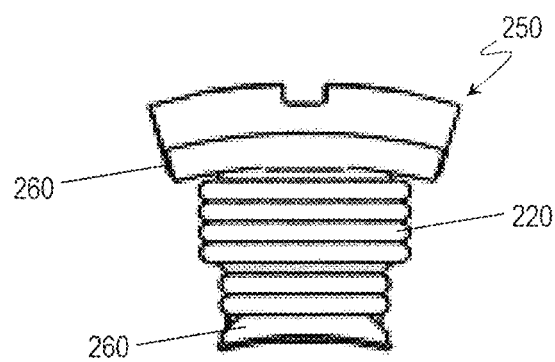
FIG. 12A is a plan view of the segment core 250 with a winding 220 fastened therearound.
Figure 12B:
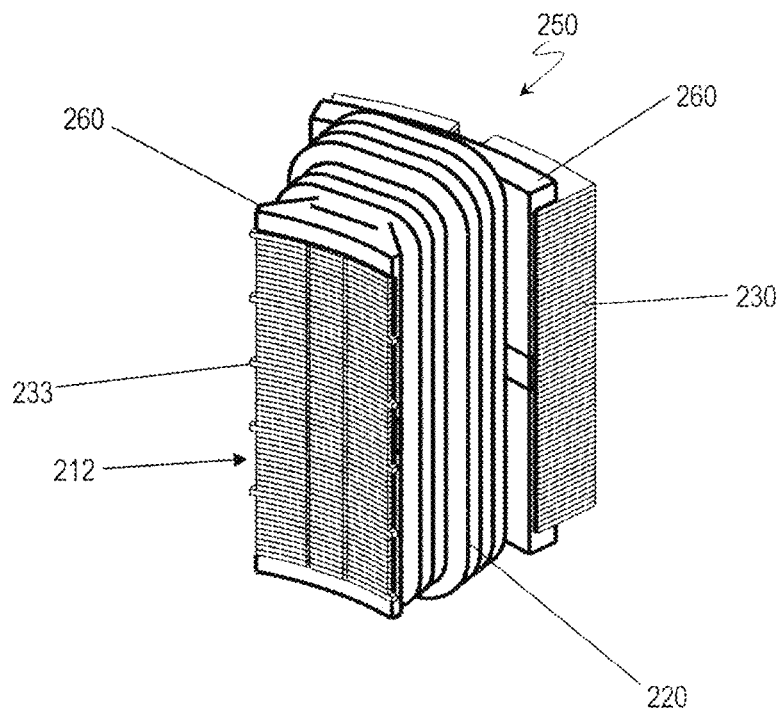
FIG. 12B is a perspective view of the segment core 250 with the winding 220 fastened around the multilayer tooth 212.

FIG. 12A is a plan view of the segment core 250 with the winding 220 fastened therearound. FIG. 12B is a perspective view of the segment core 250 with the winding 220 fastened around the multilayer tooth 212. In the present example embodiment, insulating members 260 are fitted to the individual multilayer teeth 212 of the 12 segment cores 250 and are overlaid with the windings 220 (concentrated winding). As a procedure for winding conductors around the segment cores 250, spindle winding or nozzle winding may be employed. It is not always required that all of the segment cores 250 (the multilayer teeth 212) be provided with the windings 220, and the necessary number of segment cores 250 may be provided with the windings 220 in accordance with, for example, design specifications. In other words, the multilayer tooth 212 of at least one of the 12 segment cores 250 is to be provided with the winding 220. For example, the multilayer teeth 212 of nine segment cores 250 out of the 12 segment cores 250 may be provided with the windings 220.

Then, in Step S650, the plurality of segment cores 250 with their respective windings 220 fastened therearound are reassembled into a stator 200 having an annular shape.

Figure 13:
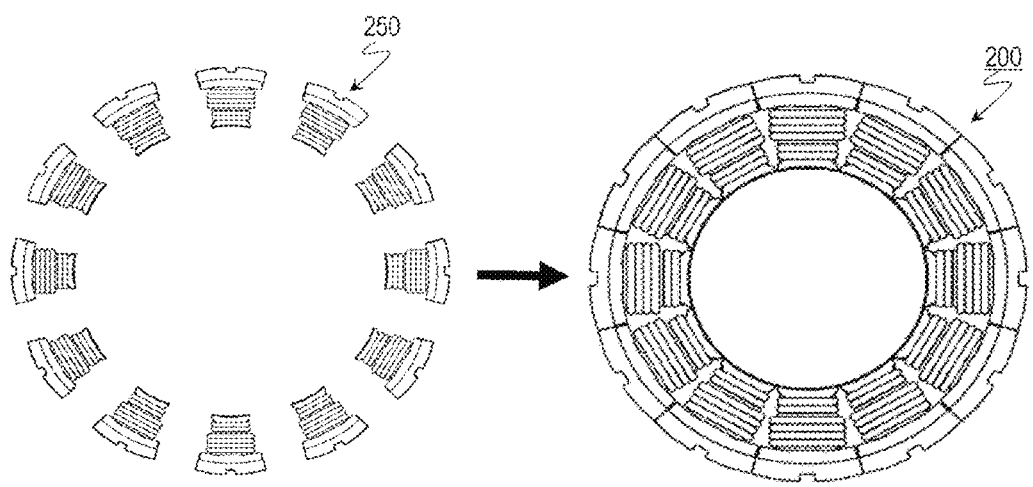
FIG. 13 is a schematic diagram illustrating the process of putting the multilayer annular core 210 divided into the plurality of segment cores 250 back into the annular shape by using a jig.
Figure 14:
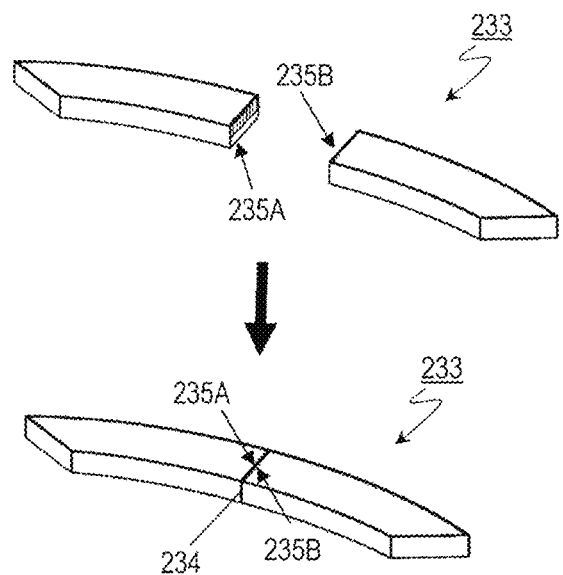
FIG. 14 is a schematic diagram illustrating the process of bringing sections of the linking portion 233 into contact with each other in the reassembling process.

FIG. 13 schematically illustrates the process of putting the multilayer annular core 210 divided into the plurality of segment cores 250 back into the annular shape by using a jig (not illustrated). FIG. 14 schematically illustrates the process of bringing the sections of the linking portion 233 into contact with each other in the reassembling process. The term "reassembling" herein means fastening the plurality of segment cores 250 together to put them back into the undivided shape (i.e., the annular shape). Specifically, after the windings 220 are fastened, the 12 segment cores 250 are reassembled to form a stator 200 having an annular shape. Each of the sections of the segment cores 250 has projections and recesses. When the sections of two adjacent segment cores 250 are brought into contact with each other, their respective shapes agree with each other, and thus the segment cores 250 have the same positional relationship as they had prior to the cutting process. In the reassembling process, the sections formed by cutting the linking portion 233 in Step S610 are brought into contact with each other. Since the segment cores 250 have the same positional relationship as they had prior to the cutting process, the sections of the linking portion 233 are also in agreement with each other. In the present example embodiment, the 12 segment cores 250 are reassembled by using a jig. In each of the 60 linking portions 233, sections (the first section 235A and the second section 235B) formed by mechanical cutting are brought into contact with each other as illustrated in FIG. 14.

The plurality of segment cores 250 are fastened to one another by, for example, bonding or laser welding. The fastening is accomplished with consideration given to (1) variations of the multilayer teeth 212 in the circumferential direction and (2) variations in the heights of the multilayer teeth 212 in the direction of the axis of the multilayer annular core 210. The sections formed by cutting the linking portion 233 may be coated with a non-magnetic material before they are brought into contact with each other. Alternatively, the sections may be in contact with each other via an adhesive.

Assume that, as in Japanese Unexamined Patent Application Publication No. 3-169235, a toothed iron core (corresponding to a member obtained by removing the core back 231 from the annular core sheet 230) and a yoke iron core (corresponding to the core back 231) are prepared as independent members. This procedure can lead to stamping variations (errors) among the teeth 232 stamped out by using a stamping tool, and thus a misalignment between tips of the teeth 232 can be produced during assembling (especially after the toothed iron core is press-fitted to the yoke iron core), making it difficult to bring tips of two adjacent teeth into contact with each other. According to the present example embodiment, meanwhile, the annular core sheet 230 including the core back 231 and the linking portion 233 is stamped out in the annular shape, and then the linking portion 233 is cut. The core back 231 and the teeth 232 are integrally formed, and this configuration enables the sections to remain in contact with each other after the cutting of the linking portion 233. With the sections in contact with each other, the plurality of multilayer annular core sheets 230 are stacked in layers, and thus the sections remain in contact with each other until the multilayer annular core 210 is divided (right up until the dividing process). This approach eliminates press fitting and thus prevents a misalignment between tips of the teeth 232, which might otherwise occur during press fitting. When the segment cores 250 are reassembled, the sections formed by cutting the linking portion 233 come into contact with each other accordingly.

In Step S660 of the method for producing the motor 100, the stator 200 and the rotor 300 are then accommodated within a housing 400.

The following briefly describes an example method for producing the rotor 300. A rotor core 331 and a magnet holder 332 are integrally formed by insert molding. Specifically, resin is injected into a mold to surround the rotor core 331 inserted therein, and the rotor core 331 and the resin are molded together. The resin is cooled to harden into a magnet holder 332. Then, a magnet 333 is inserted into the rotor core 331 and the magnet holder 332, which are integrally molded. The magnet 333 is accordingly fixed to a side of the rotor core 331 while being supported by the magnet holder 332.

A lower bearing 430 (e.g., a ball bearing) is disposed in a recessed portion 410 of the housing 400. After the stator 200 is accommodated within the housing 400, a shaft 340 is inserted into the lower bearing 430 so that the rotor 300 integral with the shaft 340 lies in the internal space of the stator 200. Finally, an upper bearing 440 (e.g., a ball bearing) is disposed in a circular hole 421 of a lid portion 420, and an opening in the upper portion of the housing 400 is covered with the upper the lid portion 420.

Some of the production steps described above may be replaced with known production procedures (such as the procedures disclosed in Japanese Unexamined Patent Application Publication No. 3-169235).

The method for producing the motor 100 and the stator 200 according to the present example embodiment, in which the seams 234 are formed in the linking portions 233 and the multilayer annular core 210 is then divided, enables the windings 220 to be easily fastened around the multilayer teeth 212 with no hindrance caused by the linking portions 233 and eliminates the press fitting to the multilayer core back 211, which is the process necessitated by, for example, the technique disclosed in Japanese Unexamined Patent Application Publication No. 3-169235. In addition to facilitating the assembly of the stator 200, the method avoids detrimental effects caused by contamination, which could otherwise occur during the press fitting. Furthermore, since there is no linkage formed by the linking portion 233 alone in the assembling step, the linking portion 233 are less prone to deformation.

As described above, the present example embodiment enables, through the adoption of the linking portions 233, the stator 200 to attain increased stiffness and the motor 100 to achieve a vibration reduction. Furthermore, the linking portions 233 have the sections formed by mechanical cutting, and this configuration reduces the occurrence of flux leakage through the linking portions 233.

The following describes a structure of the motor 100 including the linking portions 233 that more effectively reduces the vibration of the motor 100. An arrangement of the linking portions 233 will be described below which more effectively reduces the vibration of the motor 100 provided with the stator 200 including 12 multilayer teeth 212 and the rotor including 10 magnets 333.

Figure 15:
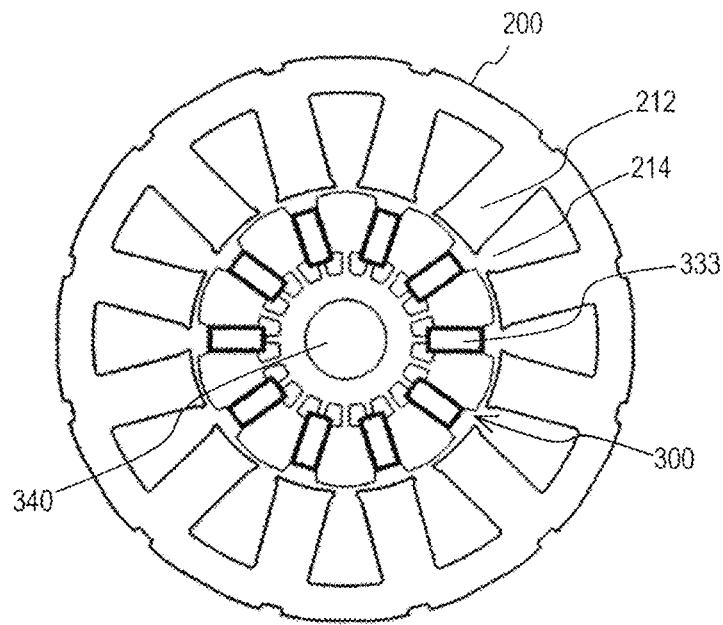
FIG. 15 is a plan view of the stator 200 and the rotor 300 of the motor 100 according to an example embodiment of the present disclosure.
Figure 16:
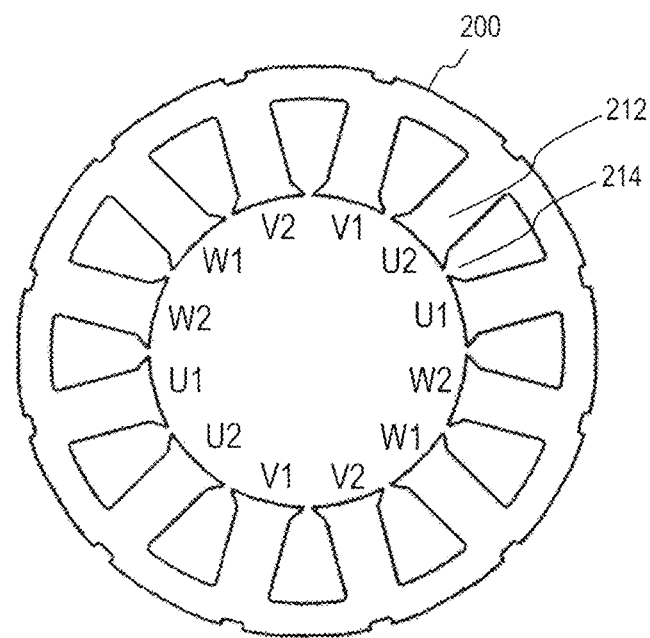
FIG. 16 is a plan view of the stator 200 according to an example embodiment of the present disclosure.

FIG. 15 is a plan view of the stator 200 and the rotor 300 of the motor 100 according to an example embodiment of the present disclosure. FIG. 16 is a plan view of the stator 200 according to an example embodiment of the present disclosure. FIGS. 15 and 16 omit the windings 220 for the sake of clarity. The stator 200 mentioned here includes 12 multilayer teeth 212. The rotor 300 includes 10 magnets 333. The structure including the given number of multilayer teeth 212 and the given number of magnets 333 is also known as 12S10P (12 slots 10 poles).

The motor 100 mentioned here is a three-phase motor including windings of three phases (U, V, and W phases). Referring to the plan view in FIG. 16, the 12 multilayer teeth 212 are associated with the U phase, the V phase, and the W phase counterclockwise in the order of U1, U2, V1, V2, W1, W2, U1, U2, V1, V2, W1, and W2. The multilayer teeth 212 are arranged in such a manner that two successive multilayer teeth 212 associated with one phase are followed by two successive multilayer teeth 212 associated with another phase. Referring to the plan view in FIG. 15, the rotor 300 rotates counterclockwise. Each of the plurality of annular core sheets 230 included in the stator 200 is provided with 12 teeth 232. The 12 teeth 232 of each of the annular core sheets 230 are associated with the U phase, the V phase, and the W phase in the order illustrated in FIG. 16.

Figure 17:
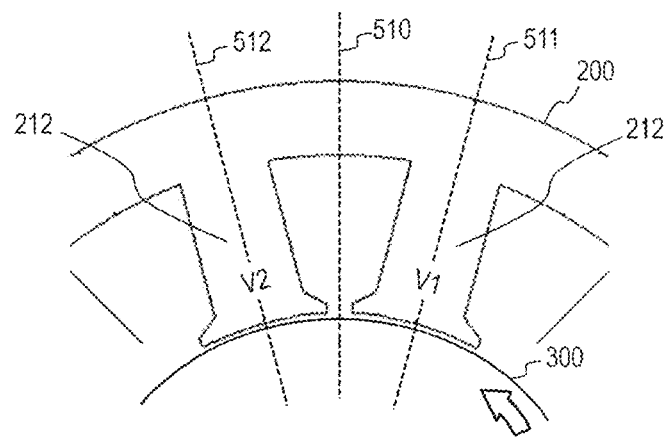
FIG. 17 illustrates two multilayer teeth 212 associated with the same phase.

FIG. 17 illustrates two multilayer teeth 212 associated with the same phase. FIG. 17 takes, as an example, two multilayer teeth 212 associated with the V phase. The multilayer tooth 212 located upstream in the rotational direction of the rotor 300 rotating counterclockwise is herein referred to as a V1 multilayer tooth 212 and the multilayer tooth 212 located downstream is herein referred to as a V2 multilayer tooth 212. The stator 200 illustrated in FIG. 17 includes no linking portion 233.

An axis 511 represents the central axis of the V1 multilayer tooth 212 and an axis 512 represents the central axis of the V2 multilayer tooth 212. The axis 510 is the reference axis passing through the midpoint between the V1 multilayer tooth 212 and the V2 multilayer tooth 212.

The windings 220 wound around two multilayer teeth 212 associated with the same phase simultaneously carry the same amount of current. For example, a current is caused to flow through the windings 220 in such a manner that the maximum current value is attained, for example, when one of the magnets 333 of the rotor 300 is opposed to the reference axis 510. With this configuration, the timing at which the magnet 333 is opposed to the V1 multilayer tooth 212, the timing at which the maximum current value is attained, and the timing at which the magnet 333 is opposed to the V2 multilayer tooth 212 have a time lag therebetween (are out of phase with each other). Thus, torque generated by the magnet 333 and the V1 multilayer tooth 212 and torque generated by the magnet 333 and the V2 multilayer tooth 212 are not equal in amount.

Figure 18:
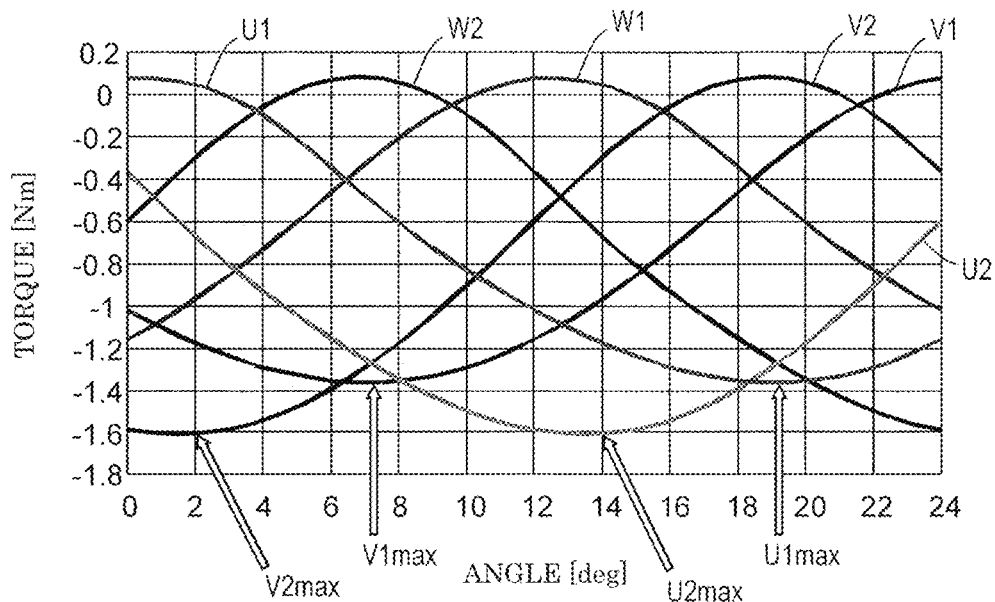
FIG. 18 illustrates torque generated by a magnet 333 and the individual multilayer teeth.

FIG. 18 illustrates the torque generated by the magnet 333 and the individual multilayer teeth. In FIG. 18, the vertical axis represents the torque and the horizontal axis represents the angle. Referring to FIG. 18, a negative value on the vertical axis whose absolute value is larger indicates that a greater amount of torque is generated. As indicated in FIG. 18, a maximum value V1max of the torque generated by the magnet 333 and the V1 multilayer tooth 212 is not equal to a maximum value V2max of the torque generated by the magnet 333 and the V2 multilayer tooth 212. Similarly, a maximum value U1max of the torque generated by the magnet 333 and a U1 multilayer tooth 212 is not equal to a maximum value U2max of the torque generated by the magnet 333 and a U2 multilayer tooth 212. Likewise, the maximum value of the torque relevant to a W1 multilayer tooth 212 and the maximum value of the torque relevant to a W2 multilayer tooth 212, which are omitted from FIG. 18, are not equal to each other. Such a difference between the maximum values of the torque relevant to the multilayer teeth 212 associated with the same phase causes an increase in torque ripple, which is the range of variations in torque production, and the motor 100 creates stronger vibration accordingly.

Figure 19:
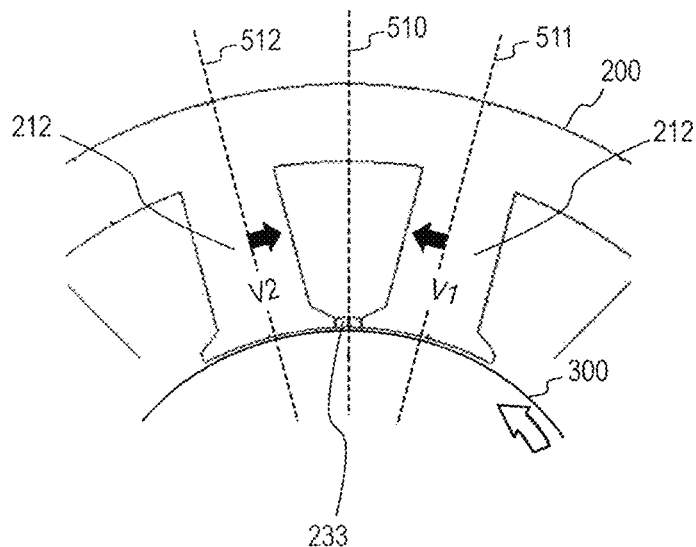
FIG. 19 illustrates two multilayer teeth 212 associated with the same phase.

The following describes two multilayer teeth 212 associated with the same phase in the stator structure including the liking portion 233. FIG. 19 illustrates two multilayer teeth 212 associated with the same phase. FIG. 19 takes, as an example, two multilayer teeth 212 associated with the V phase. The stator 200 illustrated in FIG. 19 includes the linking portion 233 forming a link between adjacent multilayer teeth 212 associated with the same phase. The V1 multilayer tooth 212 and the V2 multilayer tooth 212 are linked to each other via the linking portion 233.

In the structure including the linking portion 233, part of the linking portion 233 extends from the tip of the V1 multilayer tooth 212 toward the reference axis 510. Similarly, part of the linking portion 233 extends from the tip of the V2 multilayer tooth 212 toward the reference axis 510. Thus, the central axis 511 of the V1 multilayer tooth 212 is closer to the reference axis 510 in the structure illustrated in FIG. 19 than in the structure illustrated in FIG. 17. Similarly, the central axis 512 of the V2 multilayer tooth 212 is closer to the reference axis 510 in the structure illustrated in FIG. 19 than in the structure illustrated in FIG. 17.

Figure 20:
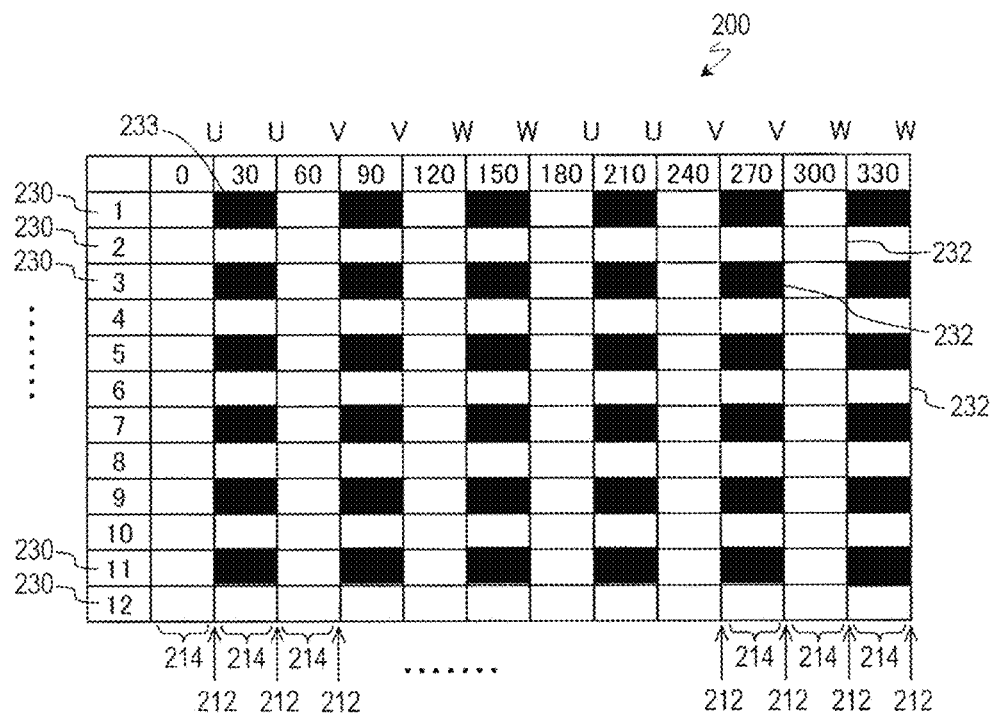
FIG. 20 illustrates positions of the linking portions 233 within the stator 200 according to an example embodiment of the present disclosure.

The following describes the positions of the linking portions 233 within the stator 200 according to an example embodiment of the present disclosure. FIG. 20 illustrates the positions of the linking portions 233 within the stator 200 according to an example embodiment of the present disclosure. In a lateral direction of FIG. 20 are arranged 12 multilayer teeth 212, each of which is associated with the U phase, the V phase, or the W phase. The numerical values 0, 30, 60, . . . , and 330 in a horizontal row are the angles in the circumferential direction of the stator 200. With the number of multilayer teeth 212 being 12, the multilayer teeth 212 are arranged in the stator 200 at equal intervals of 30 degrees. The stator 200 mentioned here includes 12 annular core sheets 230. The numbers 1, 2, 3, . . . , and 12 in a vertical row of FIG. 20 represent the 12 annular core sheets 230 stacked in layers. Although the stator mentioned here includes the 12 annular core sheet 230, this value is merely an example and the number of annular core sheet 230 is determined as appropriate in accordance with requisite characteristics demanded of the motor. In some example embodiments, 60 annular core sheets 230 are stacked in layers as described above.

Of the 12 annular core sheets 230 included in the structure of the stator 200 illustrated in FIG. 20, six annular core sheets each include six linking portions 233. Of the 12 annular core sheets 230, the other six annular core sheets include no linking portion 233. Each of the annular core sheets 230 including the linking portions 233 and each of the annular core sheets 230 including no linking portion 233 are alternately stacked on top of one another. Black-filled boxes in FIG. 20 represent the linking portions 233. Each of the six linking portions 233 of an annular core sheet 230 forms a link between corresponding adjacent teeth 232 associated with the same phase.

Of the 12 annular core sheets 230, the uppermost annular core sheet 230 includes two linking portions 233 each forming a link between corresponding teeth 232 associated with the U phase. Another two linking portions 233 each form a link between corresponding teeth 232 associated with the V phase. The remaining two linking portions 233 each form a link between corresponding teeth 232 associated with the W phase. Each of the third, fifth, seventh, ninth, and eleventh annular core sheets 230 from the top includes six linking portions 233 forming the linking pattern identical to the linking pattern formed in the uppermost annular core sheet 230.

Figure 21:
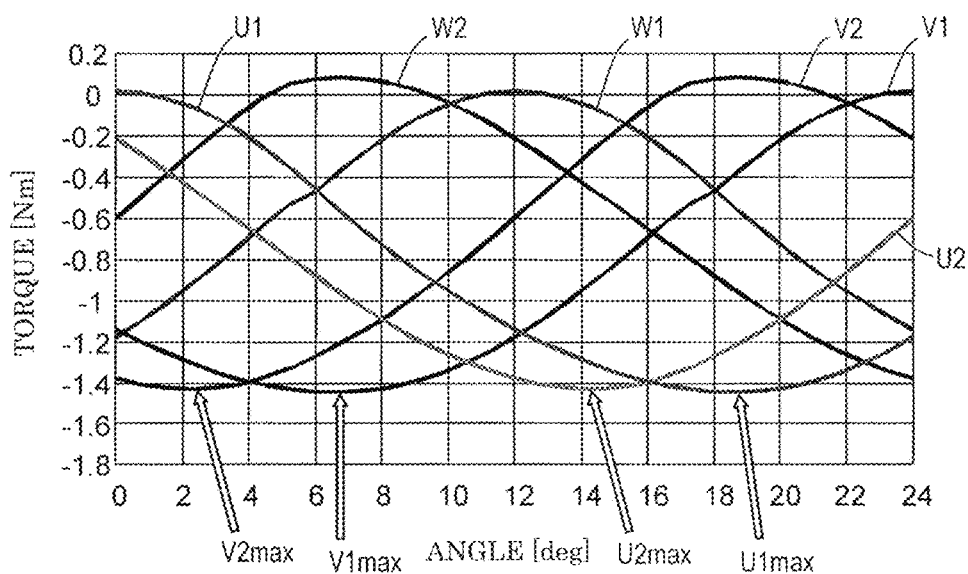
FIG. 21 illustrates torque generated by the magnet 333 and the individual multilayer teeth.

FIG. 21 illustrates torque generated by the magnet 333 and the individual multilayer teeth in the stator structure illustrated in FIG. 20. In FIG. 21, the vertical axis represents the torque and the horizontal axis represents the angle. Referring to FIG. 21, a negative value on the vertical axis whose absolute value is larger indicates that a greater amount of torque is generated. In the stator structure illustrated in FIG. 20, the maximum value V1max of the torque generated by the magnet 333 and the V1 multilayer tooth 212 is close to the maximum value V2max of the torque generated by the magnet 333 and the V2 multilayer tooth 212. Similarly, the maximum value U1max of the torque generated by the magnet 333 and the U1 multilayer tooth 212 is close to the maximum value U2max of the torque generated by the magnet 333 and the U2 multilayer tooth 212. Likewise, the maximum value of the torque relevant to the W1 multilayer tooth 212 and the maximum value of the torque relevant to the W2 multilayer tooth 212, which are omitted from FIG. 21, are close to each other. The proximity of the maximum values of the torque relevant to the multilayer teeth 212 associated with the same phase leads to a reduction in torque ripple, and thus the vibration of the motor 100 is reduced.

As described with reference to FIG. 19, the central axes 511 and 512 of the multilayer teeth 212 are close to the reference axis 510 in the structure in which each of the linking portions 233 forms a link between corresponding multilayer teeth 212 associated with the same phase. That is, the timing at which the magnet 333 is on the central axis 511, the timing at which the maximum current value is attained, and the timing at which the magnet 333 is on the central axis 512 have a small time lag therebetween (are less out of phase with each other). This feature conceivably reduces the difference between the maximum values of the torque relevant to the multilayer teeth 212 associated with the same phase.

The configuration in which an appropriate number of annular core sheet 230 including the linking portions 233 and an appropriate number of annular core sheet 230 including no linking portion 233 are stacked in layers suppresses a reduction in the torque of the motor 100 and reduces torque ripple, thus enabling a vibration reduction.

Figure 22:
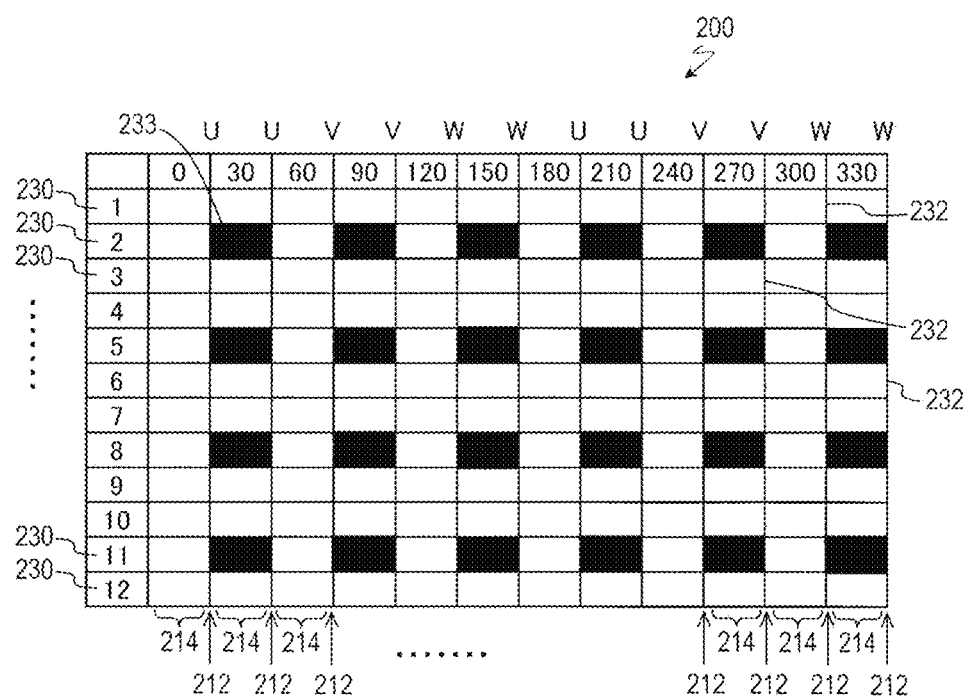
FIG. 22 illustrates positions of the linking portions 233 within the stator 200 according to another example embodiment of the present disclosure.

FIG. 22 illustrates the stator structure including the linking portions 233 according to another example embodiment of the present disclosure. Referring to FIG. 20, the six annular core sheets 230 including the linking portions 233 and the six annular core sheets 230 including no linking portion 233 are stacked in layers. Referring to FIG. 22, four annular core sheets 230 including the linking portions 233 and eight annular core sheets 230 including no linking portion 233 are stacked in layers.

Figure 23:
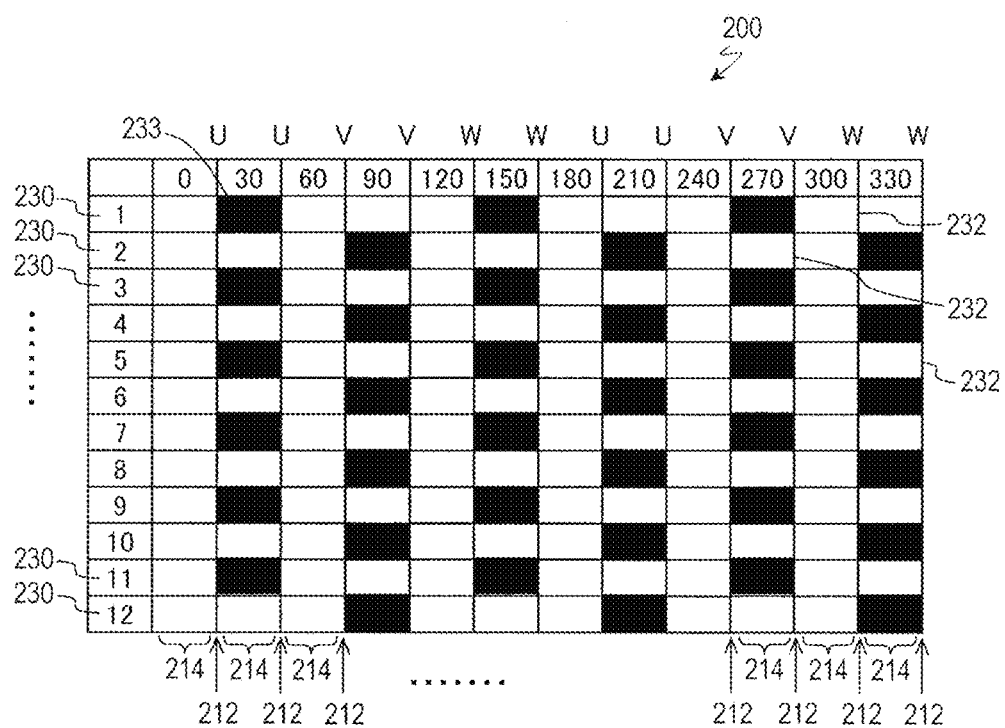
FIG. 23 illustrates positions of the linking portions 233 within the stator 200 according to still another example embodiment of the present disclosure.

FIG. 23 illustrates a stator structure including the linking portions 233 according to still another example embodiment of the present disclosure. In the structure of the stator 200 illustrated in FIG. 23, 12 annular core sheets 230 each include three linking portions 233. The stator 200 illustrated in FIG. 23 is constructed of the 12 annular core sheets 230, which are stacked on top of one another in a manner so as to be individually rotated 60 degrees in the circumferential direction. Black-filled boxes in FIG. 23 represent the linking portions 233. Each of the three linking portions 233 of an annular core sheet 230 forms a link between corresponding adjacent teeth 232 associated with the same phase.

Of the 12 annular core sheets 230, the uppermost annular core sheet 230 includes one linking portion 233 forming a link between the teeth 232 associated with the U phase. Another linking portion 233 forms a link between the teeth 232 associated with the V phase. The remaining linking portion 233 forms a link between the teeth 232 associated with the W phase. Each of the second to twelfth annular core sheets 230 from the top includes six linking portions 233 forming the linking pattern identical to the linking pattern formed in the uppermost annular core sheet 230.

In the stator structures illustrated in FIGS. 22 and 23, each of the linking portions 233 forms a link between corresponding multilayer teeth 212 associated with the same phase. This configuration suppresses a reduction in the torque of the motor 100 and reduces torque ripple, thus enabling a vibration reduction.

The example embodiment above describes, as an example, the structure provided with the stator 200 including 12 multilayer teeth 212 and the rotor 300 including 10 magnets 333. In an alternative configuration, the stator 200 may include 12 multilayer teeth 212 and the rotor 300 may include 14 magnets 333, where effects similar to those of the example embodiment above may be attained.

Example embodiments of the present disclosure may be applicable to a wide variety of motors to be included in, for example, vacuum cleaners, dryers, ceiling fans, washing machines, refrigerators, and electric power steering apparatuses.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator of an electric motor, comprising:
a multilayer body including a plurality of annular core sheets stacked in layers and a plurality of multilayer teeth; and
a plurality of windings fastened around the plurality of multilayer teeth; wherein
each of the plurality of annular core sheets includes:
an annular core back; and
a plurality of teeth disposed at regular spacings along an inner circumference of the core back and protruding toward a center of the core back;
the plurality of windings include windings of three phases;
the three phases include a first phase, a second phase, and a third phase;
the plurality of teeth included in each of the plurality of annular core sheets are respectively associated with the first phase, the second phase, and the third phase;
the plurality of annular core sheets include a first annular core sheet;
the first annular core sheet includes a plurality of linking portions, each of the plurality of linking portions defining a link between tips of two adjacent teeth and including a seam;
the plurality of linking portions include a first linking portion, a second linking portion, and a third linking portion;
the first linking portion provides a link between the teeth associated with the first phase;
the second linking portion provides a link between the teeth associated with the second phase;
the third linking portion provides a link between the teeth associated with the third phase;
the plurality of linking portions are the only linking portions included in the stator; and
gaps are provided between all adjacent pairs of the teeth which are associated with two different ones of the first phase, the second phase, and the third phase to prevent any of the plurality linking portions from providing a link between any two different ones of the first phase, the second phase, and the third phase.

2. The stator according to claim 1, wherein the plurality of teeth of each of the plurality of annular core sheets are respectively associated with the first phase, the second phase, and the third phase in such a manner that two successive teeth associated with the first phase are followed by two successive teeth associated with the second phase and then followed by two successive teeth associated with the third phase.

3. The stator according to claim 1, wherein the plurality of multilayer teeth include 12 multilayer teeth.

4. The stator according to claim 3, wherein the 12 teeth of each of the plurality of annular core sheets are respectively associated with the first phase, the second phase, and the third phase in an order of the first phase, the first phase, the second phase, the second phase, the third phase, the third phase, the first phase, the first phase, the second phase, the second phase, the third phase, and the third phase.

5. The stator according to claim 4, wherein
the plurality of linking portions of the first annular core sheet further include a fourth linking portion, a fifth linking portion, and a sixth linking portion;
the fourth linking portion provides a link between the teeth associated with the first phase;
the fifth linking portion provides a link between the teeth associated with the second phase; and
the sixth linking portion provides a link between the teeth associated with the third phase.

6. The stator according to claim 1, wherein the plurality of annular core sheets include a second annular core sheet including no linking portion.

7. The stator according to claim 1, wherein each of the plurality of linking portions includes sections at the seam defined by mechanical cuts.

8. The stator according to claim 7, wherein in each of the plurality of linking portions, a first section on one side of the linking portion closer to one of the two adjacent teeth and a second section on the other side of the linking portion are in contact with each other at the seam.

9. The stator according to claim 1, wherein the multilayer body is defined by the plurality of annular core sheets that are stacked on top of one another in a manner so as to be individually rotated a predetermined angle in a circumferential direction.

10. The stator according to claim 1, wherein the multilayer body is defined by the plurality of annular core sheets that are stacked on top of one another in a manner to be individually rotated about 60 degrees in a circumferential direction.

11. An electric motor comprising:
the stator according to claim 1;
a rotor that rotates with respect to the stator; and
a housing that accommodates the stator and the rotor.

12. The electric motor according to claim 11, wherein
the stator includes the plurality of multilayer teeth defining 12 multilayer teeth; and
the rotor includes 10 magnets.

13. The electric motor according to claim 12, wherein the multilayer body is defined by the plurality of annular core sheets that are stacked on top of one another in a manner to be individually rotated about 60 degrees in a circumferential direction.

* * * * *